(12) United States Patent
O'Neill

(10) Patent No.: US 7,233,245 B2
(45) Date of Patent: Jun. 19, 2007

(54) THEFT PREVENTION SYSTEM FOR MOTORCYCLE

(76) Inventor: Daniel W. O'Neill, 8295 S. Logan Ct., Littleton, CO (US) 80122

( * ) Notice: Subject to any disclaimer, the term of this patent is extended or adjusted under 35 U.S.C. 154(b) by 189 days.

(21) Appl. No.: 11/194,388

(22) Filed: Aug. 2, 2005

(65) Prior Publication Data

US 2007/0030129 A1   Feb. 8, 2007

(51) Int. Cl.
| | |
|---|---|
| G08B 13/14 | (2006.01) |
| G08B 13/12 | (2006.01) |
| B62J 7/00 | (2006.01) |
| B62J 9/00 | (2006.01) |
| E05B 65/00 | (2006.01) |
| E05B 67/00 | (2006.01) |
| E05B 71/00 | (2006.01) |

(52) U.S. Cl. ............................... 340/568.2; 340/568.1; 340/568.3; 340/568.4; 340/539.1; 224/412; 224/413; 224/425; 224/433; 70/51; 70/52; 70/57.1; 70/58; 70/233; 70/234

(58) Field of Classification Search ............. 340/539.1, 340/568.1, 568.2, 568.4; 244/412–413, 425, 244/433; 70/51–52, 57.1, 58, 425, 433
See application file for complete search history.

(56) References Cited

U.S. PATENT DOCUMENTS

| | | | |
|---|---|---|---|
| 3,521,904 A | | 7/1970 | Sheffer |
| 3,910,081 A | * | 10/1975 | Pender ..................... 70/234 |
| 3,994,507 A | | 11/1976 | Doll et al. |
| 4,007,614 A | | 2/1977 | Schott et al. |
| 4,028,916 A | * | 6/1977 | Pender ..................... 70/233 |
| 4,325,238 A | | 4/1982 | Scherbing |
| 4,404,822 A | * | 9/1983 | Green ..................... 70/233 |
| 4,924,206 A | | 5/1990 | Ayers |
| 5,301,817 A | | 4/1994 | Merritt |
| 5,408,212 A | * | 4/1995 | Meyers et al. ............. 340/427 |
| 6,621,415 B1 | * | 9/2003 | Willis ..................... 340/568.2 |
| 7,187,284 B2 | * | 3/2007 | Masciantonio ........... 340/568.2 |
| 2002/0113704 A1 | * | 8/2002 | Hess ..................... 340/568.2 |

* cited by examiner

Primary Examiner—Benjamin C. Lee
Assistant Examiner—Lam Pham
(74) Attorney, Agent, or Firm—Donald R. Schoonover

(57) ABSTRACT

A system for using a separate fixed or massive object to prevent theft of a motorcycle, the system comprising a frame element including a hollow enclosure having a wall with an orifice therethrough; a reel rotatably mounted in the enclosure; a flexible electrically conductive sheathed cable with a proximal end wound onto the reel and a distal end with a male connector; a control mechanism having an alarm mechanism, a female connector, circuitry to connect the female connector to the proximal end of the cable, to detect presence or absence of continuity between the proximal end and distal end of the cable, and to cause the alarm mechanism to be activated when continuity between the proximal end and distal end of the cable is broken; a locking mechanism having a locked configuration wherein the male connector is prevented from being withdrawn from the female connector, and an unlocked configuration wherein the male connector is allowed to be withdrawn from the female connector; and a power source structured to provide electrical energy to the various components of the system as needed.

4 Claims, 1 Drawing Sheet

THEFT PREVENTION SYSTEM FOR MOTORCYCLE

BACKGROUND OF THE INVENTION

1. Field of the Invention

The present invention relates to accessories for motorcycles and, more specifically without limitation, to security devices for motorcycles.

2. Description of the Related Art

Crime is a term used to describe an action taken by an individual that is forbidden by the laws of the political boundaries in which the action occurs. Legislative bodies that are elected or appointed by the population over which they preside, enact laws generally. These laws are created as a means by which people and property are protected from the actions of others. In the United States, for example, a person who steals a car has committed a crime commonly known as theft. Also, stealing another person's property is a criminal action in most of the world's countries.

The list of actions that are considered to be crimes is constantly being revised. There were times when it was considered to be a crime in some parts of the world to drive an automobile along a city's streets. Today, streets are the prescribed thoroughfares for motor vehicles. There were no laws against misuse of computer technology fifty years ago because the use of computers was limited to the scientific segment of the world's population. There are crimes, though, that continue to be addressed due to their prevalence.

One set of such crimes are those related to crimes against people or property. Crimes against people include assault, kidnapping, murder, and sexual attacks. Crimes against property, include arson, motor vehicle theft, vandalism, and burglary. Crimes against property comprise nearly ninety percent of the major crimes reported in the United States. Crimes against property are generally considered to be less serious than those against people, although both can carry stiff penalties that restrict the freedom of criminals for long periods of time.

Private citizens and owners of offices and buildings are aware of the criminal activity in their environs. Attempts are constantly being made to secure one's property from theft and destruction, as well as to protect one's person from harm. These preventative actions include locking doors and windows, installing security cameras, the creation of neighborhood watch programs, and the installation of security lighting in and around one's property.

One type of property that is a common object of theft is a motorcycle, primarily because the use thereof provides a popular mode of transportation and recreation, because they can be an expensive investment, and, with the necessary manpower or equipment, can be relatively easy to steal, particularly since an operator commonly parks the motorcycle while he temporarily wanders away from the vicinity of the parked motorcycle.

Various types of locking devices have been developed that can be used to immobilize a parked motorcycle. For example, such a device may include a chain or cable passed through one or both of the wheels of the motorcycle, or may have a chain or cable that can be looped around and through a frame member of the motorcycle and also looped around or through a stationary object located adjacent to the motorcycle.

Unfortunately, such locking devices are not as effective for preventing theft as desired. It is not unusual for a person with a propensity for stealing motorcycles to carry a pair of bolt cutters in his pickup. With one squeeze of the bolt cutter handles, the cable or chain of the locking device securing the parked motorcycle is severed. Then, it is a simple matter to physically roll or lift the motorcycle into the bed of a pickup, such as by using manpower, an inclined ramp, or a hydraulic hoist for example.

What is needed is a theft prevention system that automatically signals that theft of a parked motorcycle is in progress.

SUMMARY OF THE INVENTION

The improvements of the present invention for a system for using a separate fixed or massive object to prevent theft of a motorcycle, include a frame element structured to be securely mounted on the motorcycle, the frame element including a hollow enclosure having a wall with an orifice therethrough; a reel rotatably mounted in the enclosure; a flexible electrically conductive cable having a proximal end and a distal end, the cable being encased in an electrically insulating sheath and having an electrically conductive male connector connected to, and in electrical communication with, the distal end of the cable, the distal end of the cable extending through the orifice and the proximal end of the cable being wound onto the reel; a control mechanism including an alarm mechanism, an electrically conductive female connector structured and configured to receive the male connector, electrical circuitry structured and configured to connect the female connector in electrical communication with the proximal end of the cable, detect whether continuity exists between the proximal end and distal end of the cable, and responsively cause the alarm mechanism to be activated when continuity between the proximal end and distal end of the cable is broken; and a locking mechanism having a locked configuration wherein the male connector, after being inserted into the female connector, is prevented from being withdrawn from the female connector, and an unlocked configuration wherein the male connector is allowed to be withdrawn from the female connector; and a power source structured to provide electrical energy to power the various components of the system as needed.

The control mechanism is activated by pulling a sufficient length of the distal end of the cable through the orifice wherein the distal end of the cable can be wrapped around or through the separate fixed or massive object, inserting the male connector into the female connector, and placing the locking mechanism in the locked configuration.

PRINCIPAL OBJECTS AND ADVANTAGES OF THE INVENTION

The principal objects and advantages of the present invention include: providing a theft prevention system for a motorcycle; providing such a theft prevention system with an electrically conductive cable; providing such a theft prevention system that automatically activates an alarm mechanism when an electrically conductive cable thereof is severed; and generally providing such a theft prevention system that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The present invention allows motorcycle owners to possess a high level of protection from potential motorcycle thieves. The present invention permits a parked motorcycle to be secured to a separate stationary or massive object with a sturdy, durable cable component. A thief cutting the cable causes an interruption of a continuity circuit that results in an alarm mechanism being activated.

Figure 2:
FIG. 2 is a perspective view of a pager of an alarm mechanism of the theft prevention system for a motorcycle in accordance with the present invention.
Figure 1:
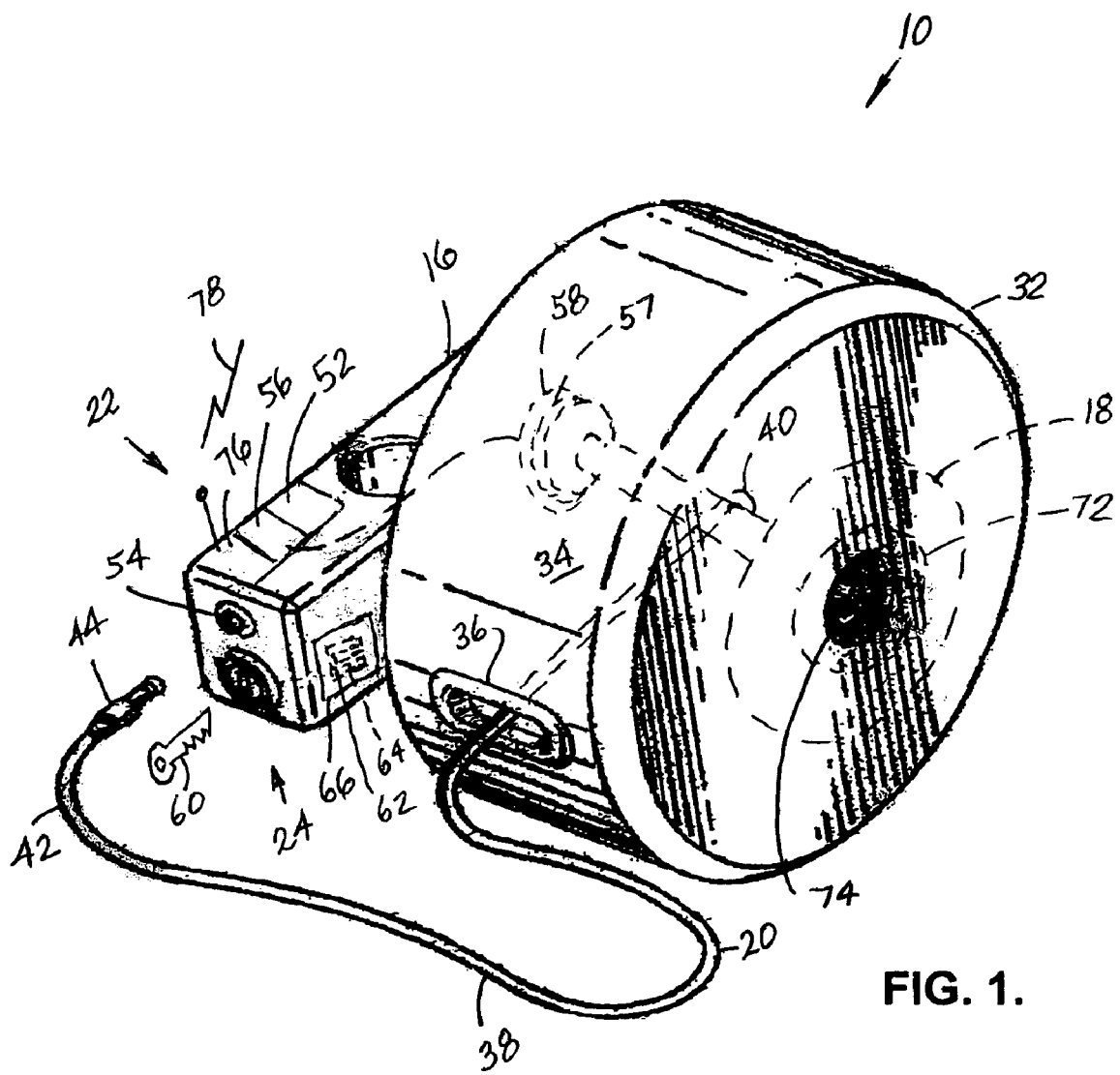
FIG. 1 is a perspective view of a theft prevention system for a motorcycle in accordance with the present invention.

The reference numeral 10 generally refers to a theft prevention system for a motorcycle in accordance with the present invention, as shown in FIGS. 1 and 2. The theft prevention system 10 includes a frame element 16, a reel 18, a cable 20, a control mechanism 22, a locking mechanism 24, and a power source 26.

The frame element 16 is structured to be securely mounted on a motorcycle (not shown). The frame element 16 includes a hollow enclosure 32 having a wall 34 with an orifice 36 therethrough.

The reel 18 is rotatably mounted in the enclosure 32.

The cable 20 is flexible and electrically conductive, preferably at least partially constructed of stranded steel. The cable 20 is encased in an electrically insulating sheath 38 and has a proximal end 40 and a distal end 42. The cable 20 includes an electrically conductive male connector 44 connected to, and in electrical communication with, the distal end 42 of the cable 20. The distal end 42 of the cable 20 extends through the orifice 36 such that the male connector 44 is spaced externally of the enclosure 32. The proximal end 40 of the cable 20 is wound onto the reel 18.

The control mechanism 22 includes an alarm mechanism 52, a female connector 54, and electrical circuitry 56. The female connector 54 is electrically conductive and is structured and configured to telescopically receive the male connector 44. The electrical circuitry 56 is structured and configured to connect the female connector 54 in electrical communication with the proximal end 40 of the cable 20.

Electrical communication between the female connector 54 and the proximal end 40 of the cable 20 may be accomplished by way of a first electrical terminal 57 mounted on the reel 18, wherein the first electrical terminal 57 is connected to the proximal end 40 of the cable 20, and a second electrical terminal 58 mounted on the enclosure 32, wherein the second electrical terminal 58 is connected to the female connector 54, and wherein sliding or rolling contact between the first and second electrical terminals 57, 58 provides electrical communication therebetween. Other suitable arrangements for establishing electrical communication between the female connector 54 and the proximal end 40 of the cable 20 are known in the art.

The electrical circuitry 56 is also structured and configured to detect whether continuity exists between the proximal end 40 and distal end 42 of the cable 20. The electrical circuitry 56 is further structured and configured to responsively cause the alarm mechanism 52 to be activated after detecting that continuity between the proximal end 40 and distal end 42 of the cable 20 has been broken. Means for designing such circuitry are known in the art and will not be described herein in detail.

The locking mechanism 24 has a locked configuration wherein the male connector 44, after being inserted into the female connector 54, is prevented from being withdrawn from the female connector 54; and an unlocked configuration wherein the male connector 44 is allowed to be withdrawn from the female connector 54. A removable key 60 may be used to convert the locking mechanism 24 to and from the locked configuration and the unlocked configuration. Means for providing such a locking mechanism are known in the art and will not be described herein in detail.

The power source 26 is structured to provide electrical energy to the various components of the theft prevention system 10 as needed. For example, the power source 26 may include a battery compartment 62 having a battery 64 and an access door 66. Preferably, the locking mechanism 24 is further structured and configured such that access to the battery compartment 62 is prevented when the locking mechanism 24 is in the locked configuration and access to the battery compartment 62 is allowed when the locking mechanism 24 is in the unlocked configuration.

The theft prevention system 10 is structured and configured such that the control mechanism 22 is activated by pulling a sufficient length of the distal end 42 of the cable 20 through the orifice 36 such that the distal end 42 of the cable 20 can be wrapped around or through a separate stationary or massive object, inserting the male connector 44 into the female connector 54, and placing the locking mechanism 24 in the locked configuration. The control mechanism 22, and the alarm mechanism 52 if is has been activated, is deactivated by placing the locking mechanism 24 in the unlocked configuration.

If desired, the theft prevention system 10 may include a rewind mechanism 72, such as the reel 18 being spring-loaded for example, that is structured and configured to rewind the proximal end 40 of the cable 20 onto the reel 18.

The alarm mechanism 52 may include a loud audible alarm 74 such as a siren 74, for example. Alternately or additionally, the control mechanism 22 may include a transmitting mechanism 76 structured and configured to wirelessly communicate a signal 78 to a remotely located pager 80 that the alarm mechanism 52 has been activated.

In an application of the theft prevention system 10 of the present invention, the frame element is mounted on a motorcycle. A sufficient length of the distal end 42 of the cable 20 is pulled through the orifice 36 such that the distal end 42 of the cable 20 can be wrapped around or through a separate stationary or massive object. The male connector 44 on the distal end 42 of the cable 20 is then inserted into the female connector 54. The theft prevention system 10 is then activated by placing the locking mechanism 24 in the locked configuration, and the key 60 is removed from the locking mechanism 24. If the continuity of the cable 20 is subsequently broken, the alarm mechanism 52 will be automatically activated.

It is to be understood that while certain forms of the present invention have been illustrated and described herein, it is not to be limited to the specific forms or arrangement of parts as described and shown.

What is claimed and desired to be covered by Letters Patent is:

1. A system for using a separate fixed or massive object to prevent theft of a motorcycle, the system comprising:
    (a) a frame element structured to be securely mounted on the motorcycle, the frame element including a hollow enclosure having a wall with an orifice therethrough;
    (b) a reel rotatably mounted in the enclosure;
    (c) a flexible electrically conductive cable having a proximal end and a distal end, the cable being encased in an electrically insulating sheath and having an electrically conductive male connector connected to, and in electrical communication with, the distal end of the cable, the distal end of the cable extending through the orifice and the proximal end of the cable being wound onto the reel;
    (d) a control mechanism including:
        (1) an alarm mechanism,
        (2) an electrically conductive female connector structured and configured to receive the male connector,
        (3) electrical circuitry structured and configured to:
            (A) connect the female connector in electrical communication with the proximal end of the cable,
            (B) detect whether continuity exists between the proximal end and distal end of the cable, and
            (C) responsively cause the alarm mechanism to be activated when continuity between the proximal end and distal end of the cable is broken;
    (e) a locking mechanism having
        (1) a locked configuration wherein the male connector, after being inserted into the female connector, is prevented from being withdrawn from the female connector, and
        (2) an unlocked configuration wherein the male connector is allowed to be withdrawn from the female connector; and
    (f) a power source structured to provide electrical energy to the various components of the system as needed; and
    (g) wherein the control mechanism is activated by
        (1) pulling a sufficient length of the distal end of the cable through the orifice wherein the distal end of the cable can be wrapped around or through the separate fixed or massive object,
        (2) inserting the male connector into the female connector, and
        (3) placing the locking mechanism in the locked configuration.

2. The system as described in claim 1, wherein the alarm mechanism is deactivated by placing the locking mechanism in the unlocked configuration.

3. The system as described in claim 1, further including a rewind mechanism structured and configured to wind the proximal end of the cable onto the reel.

4. The system as described in claim 1, further including:
    (a) pager; and
    (b) a transmitting mechanism structured and configured to wirelessly communicate a signal to the pager when continuity between the proximal and distal ends of the cable is broken.

* * * * *